(12) United States Patent
Anderson

(10) Patent No.: US 9,563,622 B1
(45) Date of Patent: Feb. 7, 2017

(54) SENTIMENT-SCORING APPLICATION SCORE UNIFICATION

(71) Applicant: TERADATA US, INC., Dayton, OH (US)

(72) Inventor: Joshua David Anderson, Fuquay-Varina, NC (US)

(73) Assignee: Teradata US, Inc., Dayton, OH (US)

( * ) Notice: Subject to any disclaimer, the term of this patent is extended or adjusted under 35 U.S.C. 154(b) by 86 days.

(21) Appl. No.: 13/730,964

(22) Filed: Dec. 29, 2012

Related U.S. Application Data

(60) Provisional application No. 61/582,238, filed on Dec. 30, 2011.

(51) Int. Cl.
*G06F 17/30* (2006.01)
*G06F 17/27* (2006.01)

(52) U.S. Cl.
CPC ..... *G06F 17/2785* (2013.01); *G06F 17/30707* (2013.01)

(58) Field of Classification Search
None
See application file for complete search history.

(56) References Cited

U.S. PATENT DOCUMENTS

| | | | |
|---|---|---|---|
| 7,107,254 B1* | 9/2006 | Dumais et al. | 706/50 |
| 8,352,405 B2* | 1/2013 | Fang et al. | 706/50 |
| 8,554,701 B1* | 10/2013 | Dillard et al. | 706/12 |
| 8,595,151 B2* | 11/2013 | Hao et al. | 705/347 |
| 8,713,007 B1* | 4/2014 | Korolev | G06N 5/048 707/729 |
| 8,862,591 B2* | 10/2014 | Chowdhury | G06F 17/2745 707/748 |
| 9,129,008 B1* | 9/2015 | Kuznetsov | G06F 17/30616 |
| 2008/0208072 A1* | 8/2008 | Fadem | A61B 5/0484 600/544 |
| 2008/0249764 A1* | 10/2008 | Huang et al. | 704/9 |
| 2009/0306967 A1* | 12/2009 | Nicolov et al. | 704/9 |
| 2010/0005050 A1* | 1/2010 | Ah-Pine | G06F 17/30864 706/52 |
| 2010/0150393 A1* | 6/2010 | Ni et al. | 382/100 |

(Continued)

OTHER PUBLICATIONS

Ensemble learning. (Nov. 13, 2014). In Wikipedia, The Free Encyclopedia. Retrieved 21:03, Dec. 9, 2014, from http://en.wikipedia.org/w/index.php?title=Ensemble_learning&oldid=633723763.*

*Primary Examiner* — Richard Bowen
(74) *Attorney, Agent, or Firm* — Randy L. Campbell, Jr.

(57) ABSTRACT

A sentiment score unification system includes a storage device configured to store a plurality of sentiment scoring applications and a sentiment unification module. The sentiment score unification system further includes a processor in communication with the memory device. The processor may be configured to receive a plurality of sentiment expressions and execute each of the plurality of sentiment scoring applications. Each of the plurality of sentiment scoring applications is executable to generate a respective sentiment score based on the plurality of sentiment expressions. Each respective sentiment score is indicative of a level of sentiment. The processor is further configured to execute the sentiment unification module. The sentiment unification module is executable to generate a single unified sentiment score based on the respective sentiment scores. A method and computer-readable medium are also disclosed.

20 Claims, 6 Drawing Sheets

(56) References Cited

U.S. PATENT DOCUMENTS

| | | | |
|---|---|---|---|
| 2010/0223581 A1* | 9/2010 | Manolescu et al. | 715/853 |
| 2010/0262454 A1* | 10/2010 | Sommer et al. | 705/10 |
| 2011/0238670 A1* | 9/2011 | Mercuri | 707/748 |
| 2012/0101808 A1* | 4/2012 | Duong-Van | G06F 17/2785 704/9 |
| 2012/0130860 A1* | 5/2012 | Suzuki et al. | 705/27.1 |
| 2012/0143683 A1* | 6/2012 | Hertz et al. | 705/14.49 |
| 2012/0191730 A1* | 7/2012 | Parikh | G06Q 30/0201 707/754 |
| 2012/0246093 A1* | 9/2012 | Stibel | G06Q 30/00 705/347 |
| 2012/0304072 A1* | 11/2012 | Mercuri et al. | 715/745 |
| 2013/0018824 A1* | 1/2013 | Ghani et al. | 706/12 |
| 2013/0018892 A1* | 1/2013 | Castellanos et al. | 707/748 |
| 2013/0085803 A1* | 4/2013 | Mauro | G06Q 30/0201 705/7.29 |
| 2013/0159277 A1* | 6/2013 | Liu et al. | 707/709 |
| 2013/0198204 A1* | 8/2013 | Williams et al. | 707/748 |
| 2014/0022106 A1* | 1/2014 | Duvoisin | G01S 13/885 342/22 |

\* cited by examiner

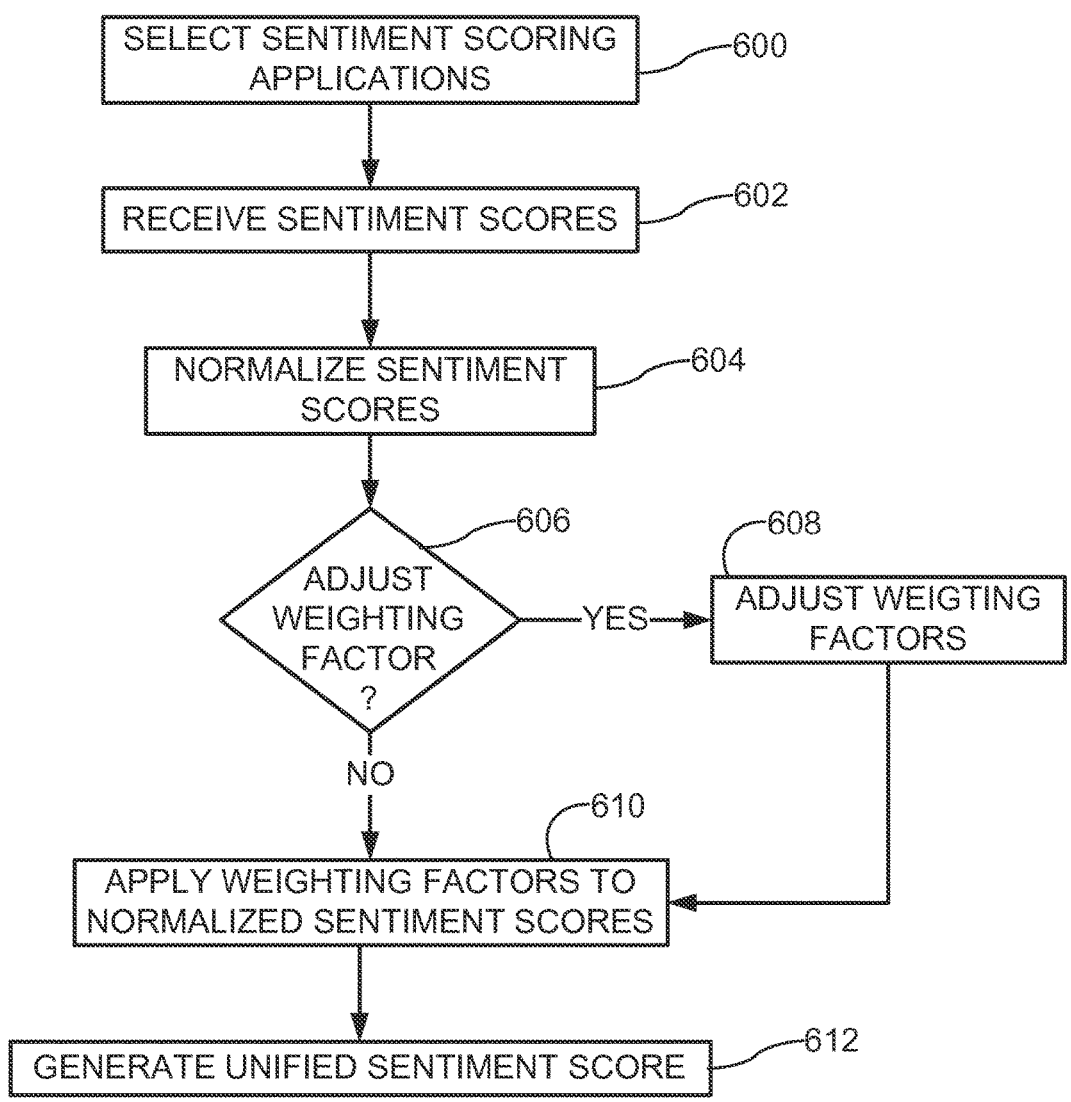

SENTIMENT-SCORING APPLICATION SCORE UNIFICATION

CLAIM OF PRIORITY

This application claims the benefit of priority under 35 U.S.C. 119(e) of U.S. Provisional Patent Application Ser. No. 61/582,238 filed on Dec. 30, 2011, the entirety of which is incorporated by reference herein.

BACKGROUND

Enterprises are typically sensitive to the opinions of the public. For example, businesses are very interested in the general sentiment held, as well as sentiment for services, products, or operational aspects, such as customer service. Currently, large amounts of data are available across the Internet and other network systems that express some level of sentiment for numerous enterprises, individuals, etc. This data may reside at social media websites, message boards, etc. While extremely informative due to the unstructured nature of this type of data, enterprises implementing customer relationship management (CRM) systems may disregard this type of data due to a lack of knowledge regarding how to leverage such data.

Various applications that may be implemented by CRM systems exist that are able to identify and score these unstructured types of data in order to provide some gauge of sentiment regarding some aspect of the enterprise. However, each of these applications implements different algorithms with no particular one distinguishing itself in performance. Thus, allowing multiple scores to be considered to produce a single score may be beneficial.

SUMMARY

According to aspect of the disclosure, a sentiment score unification system may include a storage device configured to store a plurality of sentiment scoring applications and a sentiment unification module. The sentiment score unification system may further include a processor in communication with the memory device. The processor may be configured to receive a plurality of sentiment expressions and execute each of the plurality of sentiment scoring applications. Each of the plurality of sentiment scoring applications may be executable to generate a respective sentiment score based on the plurality of sentiment expressions. Each respective sentiment score may be indicative of a level of sentiment. The processor may be further configured to execute the sentiment unification module. The sentiment unification module may be executable to generate a single unified sentiment score based on the respective sentiment scores.

According to another aspect of the disclosure, a method may include receiving a plurality of sentiment expressions and retrieving a plurality of sentiment scoring applications from a storage device. The method may further include executing each of the plurality of sentiment scoring applications. Each of the plurality of sentiment scoring applications may be executable to generate a respective sentiment score based on the plurality of sentiment expressions. Each respective sentiment score may indicative of a level of sentiment. The method may further include generating a single unified sentiment score based on the respective sentiment scores.

According to another aspect of the disclosure, a computer-readable medium may be encoded with a set of instructions executable by a processor. The set of instructions may include instructions to receive a plurality of sentiment expressions and instructions to retrieve a plurality of sentiment scoring applications from a storage device. The set of instructions may further include instructions to execute each of the plurality of sentiment scoring applications. Each of the plurality of sentiment scoring applications may be executable to generate a respective sentiment score based on the plurality of sentiment expressions. Each respective sentiment score may be indicative of a level of sentiment. The set of instructions may further include instructions to generate a single unified sentiment score based on the respective sentiment scores.

BRIEF DESCRIPTION OF THE DRAWINGS

The disclosure may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 6 is an operational flow diagram of example operation of a sentiment-scoring system.

DETAILED DESCRIPTION OF THE FIGURES

Figure 1:
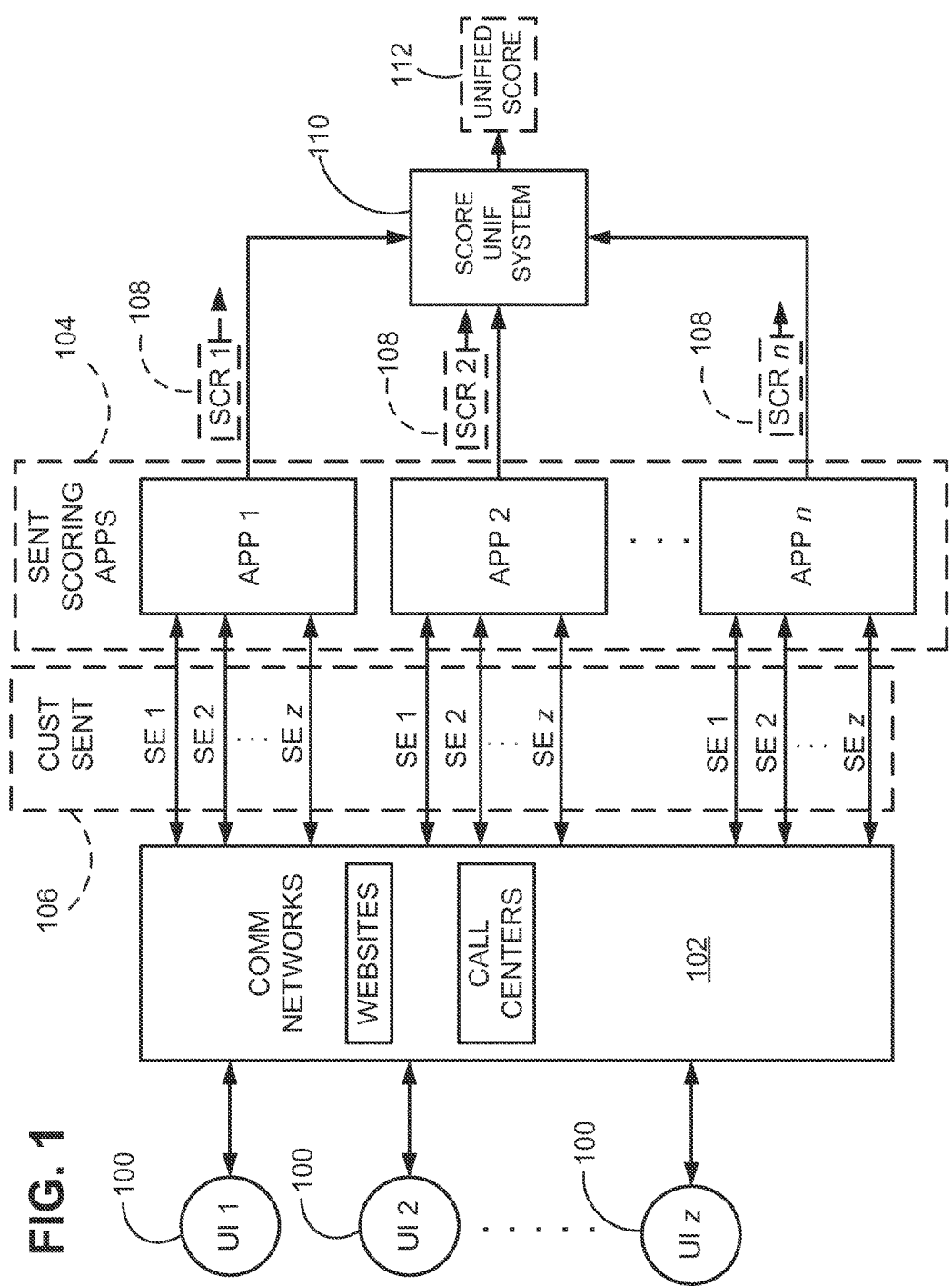
FIG. 1 is a conceptual diagram of an example system for determining a sentiment score.

FIG. 1 is a conceptual diagram of a system to generate a unified sentiment score indicating sentiment of a particular enterprise of interest or a particular aspect of the enterprise of interest. User entities, such as individuals, groups of individuals, organizations, etc., may provide sentiment regarding the enterprise in various ways. User entities such as previous, current, and potential customers may interact with various communication networks in which the sentiment is expressed. For example, user entities may interact via user interfaces 100 with various types of communication networks 102. Communication networks may extend to Internet websites, call centers, etc. In one example, a number z user interfaces 100 may interact with the various communication networks 102 at different times and with different frequencies. User entities may express sentiment directly on enterprise websites, such as through complaint and/or comment webpages. However, customer sentiment may also be scattered across the various communication networks, such as on various types of Internet websites that may include social media websites (e.g. Facebook, Twitter, etc.), message boards, etc.

Various sentiment gathering and scoring applications exist, such as GATE, Balie, and LingPipe, for example, that operate to locate sentiment expressed in a textual format, such as Facebook comments, across various types of communication networks 102. The gathered sentiment expressions may then be scored by the applications. The generated score may provide an indication on the overall sentiment of an enterprise or some aspect of an enterprise, such as satisfaction or dissatisfaction.

In one example, a number n sentiment-scoring applications 104 may search various communication networks to identify expressed sentiment associated with an enterprise, individually reference in FIG. 1 as APP 1 through APP n. In one example, each sentiment-scoring application 104 may identify expressed sentiment on the communication networks through the user interfaces 100, individually indexed as UI 1 through UI z. Each sentiment-scoring application 104 may locate and retrieve individual sentiment for each of the z user entities over some period of time. In other examples, the expressions of sentiment may be identified in other manners and provide to the sentiment scoring applications 104.

The number of user interfaces z may reflect all user entities, such as individuals, groups, etc., that interact with the various communication networks 102. These user entities may use on or more of the communication networks 102 in expressing sentiment. In FIG. 1, the sentiment expressions are individually referenced as SE 1 through SE z, which correspond to user interfaces UI 1 through UI z. In FIG. 1, sentiment expressions 106 received via user interfaces 100 may be representative of singular or multiple comments, posts, etc. received through the user-interfaces 100 and/or user account for a particular website or application. Thus, SE 1 may represent multiple instances of sentiment expression found in the communication networks 102 via user interface UI 1, for example.

Upon retrieval the sentiment expression 106, each sentiment-scoring application 104 may generate a score based on the particular scoring algorithm associated with the particular sentiment-scoring application 104. Sentiment scoring applications 104 may implement different scoring algorithms, providing varying scores attempting to quantify the same sentiment. Additionally, while each sentiment score 108 may provide an indication of overall sentiment, there may be some differences in emphasis on various aspects related to sentiment. In one example, a score unification system 110 may be implemented to combine the generated scores to provide a unified sentiment score 112, which may provide a more accurate indicator of sentiment regarding an aspect of interest of an enterprise.

Figure 2:
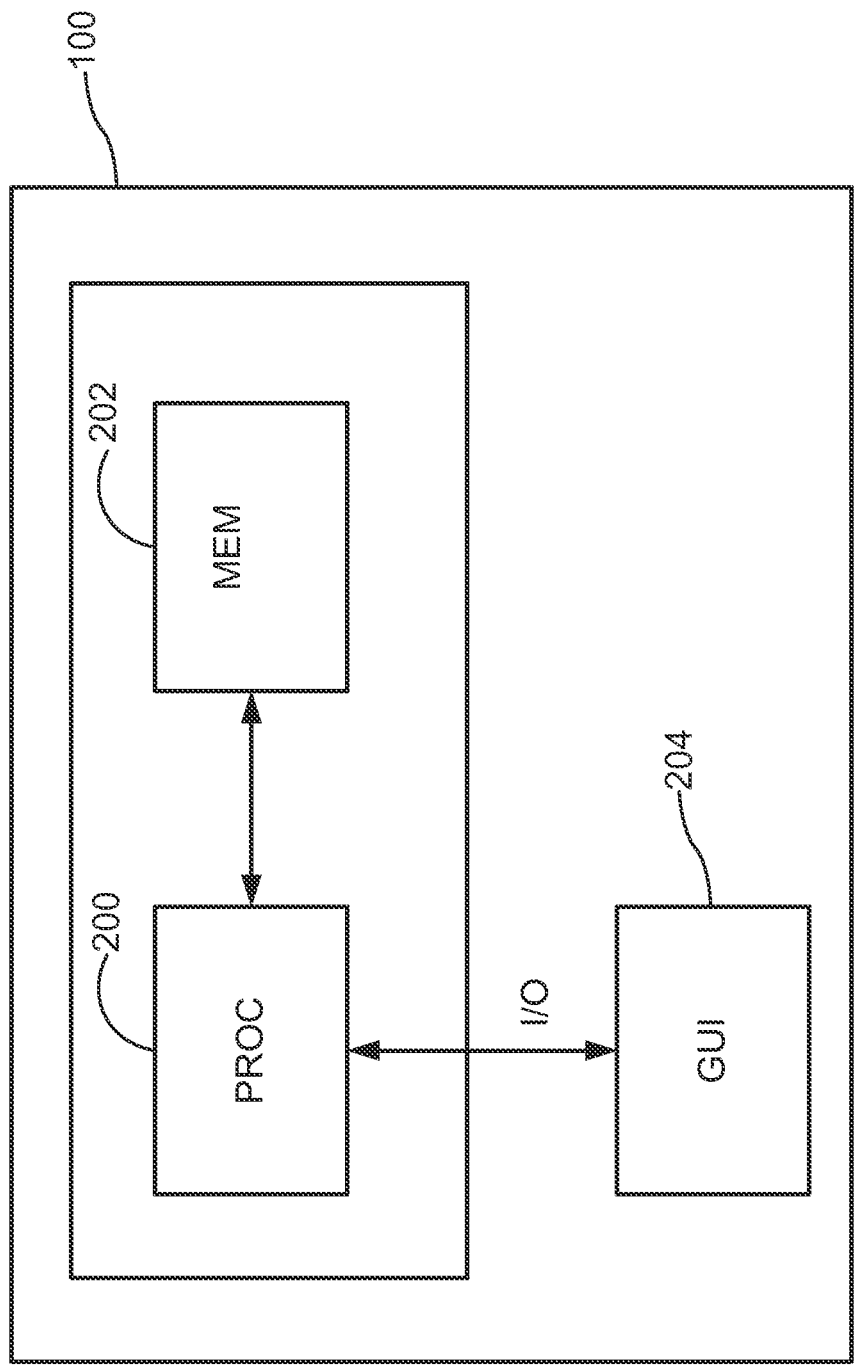
FIG. 2 is a block diagram of a user interface.

FIG. 2 is a block diagram of an example of a user interface 100. In one example, a user interface 100 may include a processor 200 and memory/storage 202. The processor 200 may include one or more processors and the memory 202 may include one or more memories. The memory 202 may also represent any storage devices, such as hard disk drives or solid state drives for persistent storage. The user interface 100 may also include a graphical user interface (GUI) 204, which may include an integrated or modular display (not shown), as well as various input devices, such as a mouse, keyboard, touchscreen, etc. (not shown). The GUI 204 may allow input/output (I/O) between a user and the processor 200. The user interface 100 may be a personal computer, tablet computer, smartphone, cellular phone, or any other device capable of interacting with one more communication networks 102. In the example of FIG. 1, the GUI 204 is shown as being a component of the user interface 100. In alternative examples, the GUI 204 may be a separate device, such as a personal computer.

Figure 3:
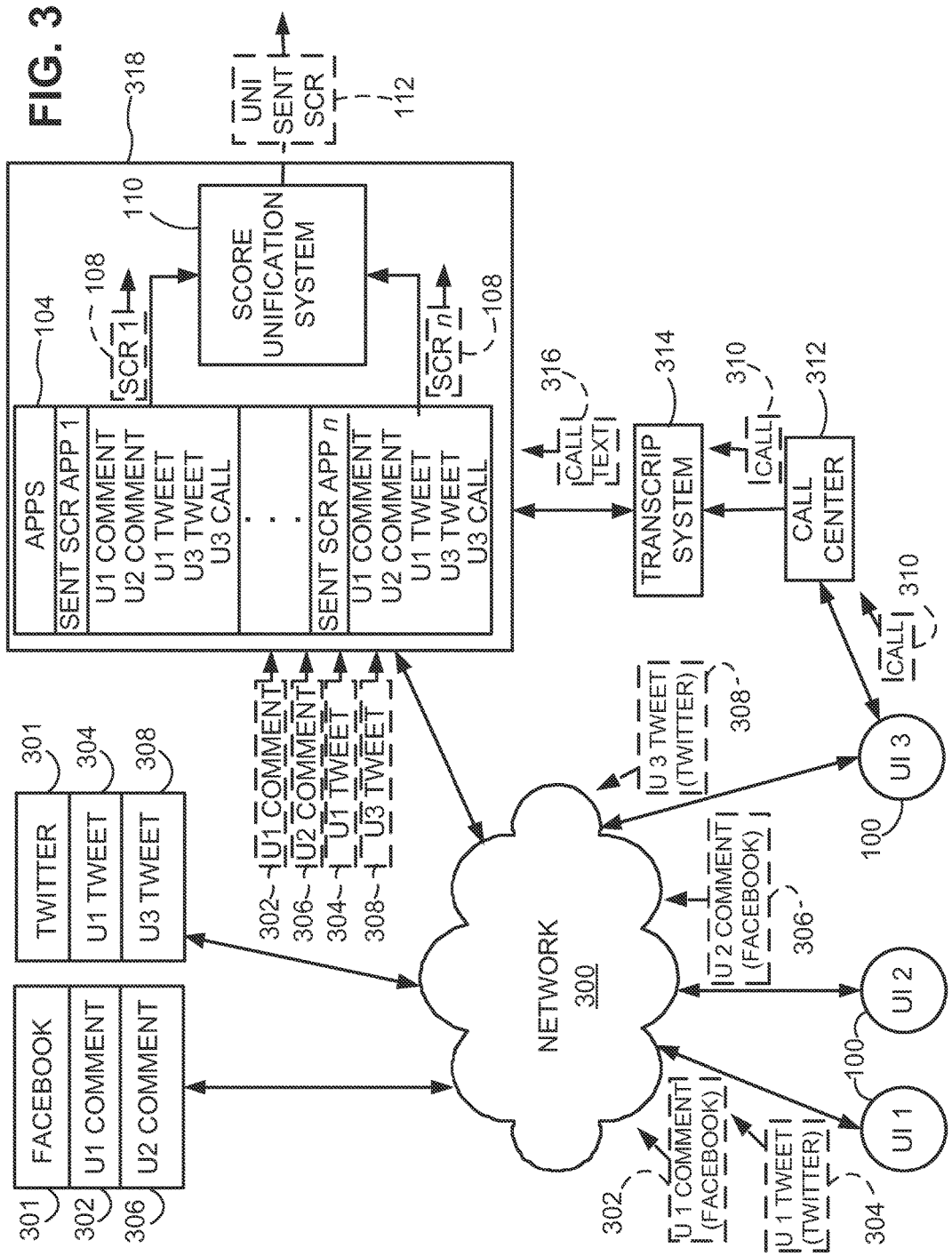
FIG. 3 is a block diagram of a sentiment scoring system.

FIG. 3 is a block diagram indicating an example of sentiment score unification. In one example, the customer interfaces 100 may be in communication with a network 300 such as the Internet. User entities operating through the user interfaces 100 may communicate with various websites 301 such as Facebook. User entities may express sentiment on websites 301 such as these through comments on Facebook, tweets on Twitter, etc. As an example, in FIG. 3 one or more user entities operating through user interface UI 1 posts a comment 302 to Facebook and a tweet 304 to Twitter regarding providing some expression of sentiment regarding the enterprise. Similarly, user entities interacting via user interface UI 2 post a comment 306 to Facebook.

The user entity interacting via user interface UI 3 posts a tweet 308 to Twitter. The user entity may also make a call 310 via UI 3 (such dual capability may be provided by devices such as a smartphone) to a call center 312 associated with the enterprise. The call 310 may express some level of sentiment associated with the enterprise. In one example, the audio associated with the call may be captured by the call center 312 and provided to a transcription service 314, or some other manner of transcription, that converts the recorded audio to call text 316.

A sentiment scoring system 318 may include an array of sentiment-scoring applications 320, individually designated as APP 1 through APP n in FIG. 1. The sentiment scoring system 318 may be in communication with the network 300 allowing each of the sentiment scoring applications 104 to search the Internet to identify expressed sentiment regarding the enterprise. Each sentiment-scoring application 104 may be individually responsible for locating expressions of sentiment or such expression may be provided to the sentiment scoring applications 104. However, in alternative examples, the sentiment-scoring applications 104 may communicate with one another to assure that each sentiment-scoring application 104 is at least aware of each identified potential expression of sentiment regarding the enterprise aspect of interest.

The sentiment-scoring applications 104 may also retrieve any other text-based information that may indicate some expression of sentiment regarding the enterprise, such as the call text 316. In such an implementation, any calls providing an expression of sentiment regarding an enterprise aspect of interest may be sent to the sentiment scoring system 318 after transcription or before if the transcription system 314 is a component of the sentiment scoring system 318.

Upon receipt of the sentiment expression by the sentiment scoring applications 104, each application may generate a sentiment score 118, individually designated in FIG. 3 as SCR 1 through SCR n. Each sentiment score 118 provides an indicator of the sentiment of some aspect of the enterprise according to the particular sentiment-scoring application 104. In one example, the score unification system 110 may be implemented by the sentiment-scoring system 300 to unify the sentiment scores 108 in order to provide a unified sentiment score 112. The unified sentiment score 112 may provide a more comprehensive overall sentiment regarding an enterprise as compared to each individual score 118.

Figure 4:
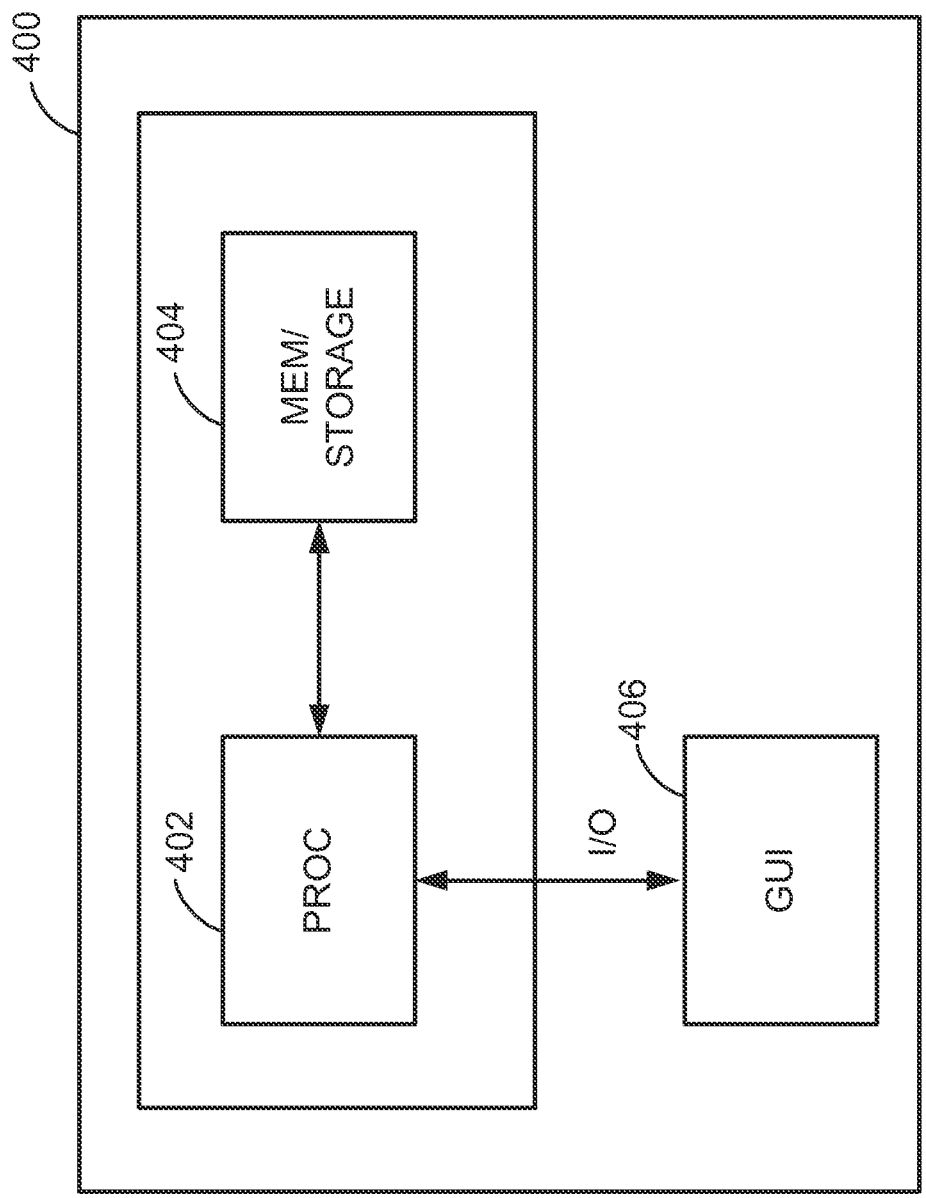
FIG. 4 is an example of a computer system to implement the sentiment-scoring system of FIG. 3.

FIG. 4 is a block diagram of a computer system 400 capable of implementing the sentiment scoring system 318. In one example, the computer system 400 may include a processor 402 and a memory 404. The processor 402 may include one or more processors and the memory 404 may include one or more memories. The memory 404 may also represent any storage devices, such as hard disk drives or solid state drives for persistent storage. The computer system 400 may also include a GUI 406 in communication with the processor 402 and memory 404 to allow input/output (I/O) between a user entity and the sentiment scoring system 318.

Figure 5:
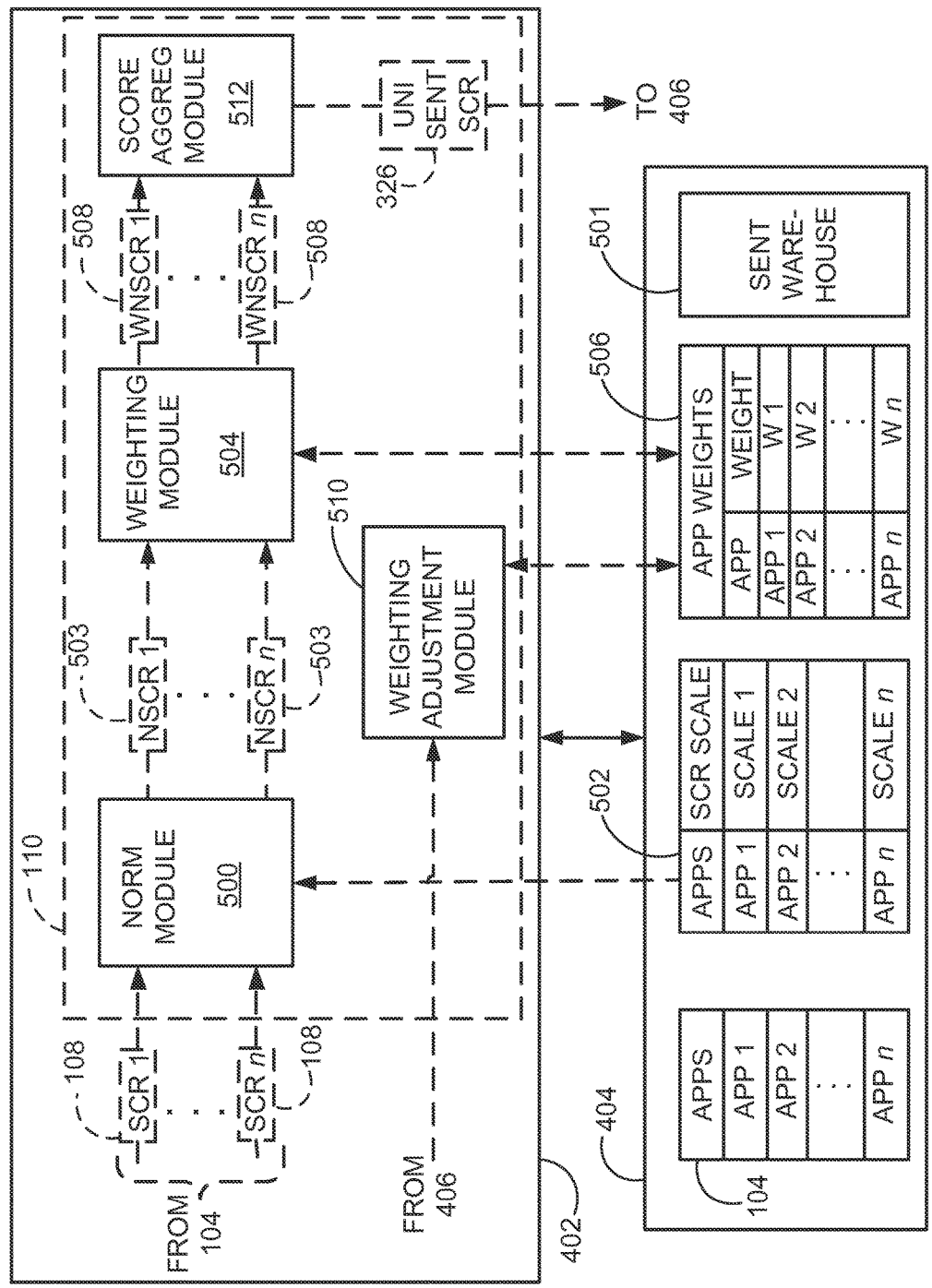
FIG. 5 is a block diagram of an example of a score unification system.

FIG. 5 is a block diagram of an example of the score unification system 110. Due to the sentiment scoring applications 104 operating independently, they may each have different scoring systems. Thus, in order to accurately unify the scores generated by the various sentiment scoring applications 104, normalization of the scores may be performed. In one example, a normalization module 500 of the score unification system 324 may receive the scores 322. Upon receipt of the sentiment scores 322, the normalization module 500. As described herein, "modules" are defined to include software, hardware or some combination thereof executable by one or more physical and/or virtual processors. Software modules may include instructions stored in the one or more memories that are executable by one or more processors. Hardware modules may include various devices, components, circuits, gates, circuit boards, and the like that are executable, directed, and/or controlled for performance by one or more processors.

The sentiment-scoring applications 104 may retrieve the expression of sentiment for automatic scoring or may retrieve the expression of sentiment and store them in a sentiment expression data warehouse 501 for later scoring by all active and available sentiment-scoring applications 104. The applications 104 may also be stored in memory 404 until executed. Additional applications 104 may be added or removed and each application may be individually designated for execution or all applications 104 may be designated as active.

The normalization module 500 may have access to the scoring scales of each sentiment-scoring application 104 to use in normalizing the scores 302. The sentiment-scoring application scoring scales may be stored in a scoring scale table 502 along with the sentiment scoring applications 104 to be executed by the processor 402 during operation of the sentiment scoring system 318. In FIG. 5, the scoring scales for each sentiment-scoring application 104 are individually designated as SCALE 1 through SCALE n with each corresponding to a particular sentiment-scoring application 104. The normalization module 500 may generate a normalized sentiment score 503 for each sentiment score 108. In FIG. 1 each normalized sentiment score 503 is individually designated as NSCR 1 through NSCR n.

As sentiment-scoring applications 104 are used, they may instill different levels of confidence in their respective accuracies regarding accuracy of determining sentiment. In one example, weighting factors may be used to indicate a particular level of confidence in the various sentiment-scoring applications 104. Higher weighting factors may indicate a higher confidence level relative to other sentiment-scoring applications 104. In one example, the score unification system 100 may include a weighting module 504. The weighting module 504 may access an application weight table 506 stored in the memory 404. The application weight table 506 may include a weighting factor value assigned for each sentiment scoring application 104. In FIG. 5, each weighting factor is individually designated as W 1 through W n.

Upon receipt of the normalized sentiment scores 503, the weighting module 504 may access the application weight table 506 to retrieve the weighting factors corresponding to each normalized sentiment score 503 and apply the weighting factors. In one example, each normalized sentiment score 503 may be multiplied by the corresponding weighting factor. In alternative examples, the weighting factors may be applied in different manners. Application of the weighting factors to the normalized sentiment scores 503 may generate weighted normalized sentiment scores 508. Each weighted score 508 is individually designated in FIG. 5 as WNSCR 1 through WNSCR n.

The unification scoring system 110 may also include a weighting adjustment module 510. The weighting adjustment module 510 may access the application weight table 506 to provide an opportunity to adjust the weighting factors corresponding to the sentiment scoring applications 108. In one example, the weighting adjustment module 510 may receive input via the GUI 406 of the computer system 400 allowing the weighting factors to be user-adjusted to desired levels. In alternative examples, the weighting adjustment module 510 may automatically adjust the weighting factors based on various criteria, such as the age of the sentiment-scoring applications 104, for example. In one scenario, newer applications 104 may be more reliable than previous ones, allowing each new application to be added to the applications 104 being used. The weight may be higher for new applications and descend in reverse order of age.

The weighted scores 508 may be provided to a score unification module 512. The score unification module 512 may combine the weighted scores 508 to generate a single unified score 514 that may indicate an overall sentiment regarding an enterprise of interest. In one example, the score unification module 512 may add all weighted scores 508 to generate the unified sentiment score 514. In such a configuration, the magnitude of the unified sentiment score 514 may directly indicate the level of satisfaction of overall sentiment, e.g., a higher score indicate more positive sentiment. Other algorithms combining the scores 508 may be implemented such as average score, etc. The unified score 326 may be provided to the GUI 406 or any other desired output device in direct or indirect communication with the computer system 400.

FIG. 6 is an operational flow diagram of example operation of the unified scoring system 318. In one example, the unified scoring system 110 may select the particular sentiment scoring applications 104 to be used to identify and score sentiment (600). In one example, all available sentiment-scoring applications 104 may be used by the sentiment-scoring system 110. In other examples, sentiment-scoring applications 104 may be selected by the sentiment scoring system 110 based on predetermined criteria such as the age of the sentiment-scoring applications 104 or the frequency of use. For example, the sentiment-scoring system 110 may select the ten newest sentiment-scoring applications 104 or may select the ten most used sentiment-scoring applications 104 over some predetermined period of time. The number of sentiment-scoring applications 104 and predetermined criteria for selecting the applications 104 may vary based on the particular application and availability of the applications 104. In alternative examples, input received via the GUI 406 may indicate which sentiment-scoring applications 104 are to be used.

In one example, the sentiment-scoring system 110 may operate on a regular basis to continuously provide an up-to-date unified sentiment score 112. In such examples, the sentiment-scoring applications 104 may identify sentiment over a predetermined rolling time window. In such an arrangement, generating the unified sentiment score 112 over various time windows may provide trend information of the sentiment over time. The size of the time window may be selectively adjustable. In other examples, the sentiment-scoring system 110 may operate based on prompting from user entity input, such has via the GUI 406, for example.

Upon receipt of the sentiment scores 108 (602), the sentiment-scoring system 110 may normalize the sentiment scores 108 (604). Upon normalization of the sentiment scores 108, adjustment of the weighting factors from the application weight table 506 may be considered. In one example, the sentiment scoring system 110 may automatically adjust the weighting factors in the application weighting factor table 506. In other examples, an operator of the sentiment-scoring system 110 may be prompted via the GUI 406 for adjustment of the weighting factors. Upon adjustment of the weighting factors (608) or if no adjustment occurs, the current weighting factors may be applied to the normalized sentiment scores 503 (610). The weighted scores 508 may then be combined to produce the unified sentiment score 112 (612). In one example, the weighted scores 508 may be added together to produce the unified sentiment score 326. In alternative examples, the weighted scores may be combined in different manners to produce the unified sentiment score 112.

The term "memory" or "memories" used herein may include one or more memories and may be computer-readable storage media or memories, such as a cache, buffer, RAM, removable media, hard drive, flash drive or other computer-readable storage media. Computer-readable storage media may include various types of volatile and non-volatile storage media. Processors described herein may implement various processing techniques such as multiprocessing, multitasking, parallel processing and the like, for example.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A sentiment score unification system comprising:
a storage device configured to store a sentiment unification module;
a processor in communication with the memory device, the processor configured to:
receive a plurality of single sentiment scores, wherein each single sentiment score is from a respective scoring sentiment application, wherein each single sentiment score is indicative of a respective overall sentiment of a plurality of sentiment expressions, wherein each sentiment expression from the plurality of sentiment expressions is from a different, independent sentiment source; and
execute the sentiment unification module, wherein the sentiment unification module is executable to generate a single unified sentiment score based on the plurality of single sentiment scores, wherein the single unified sentiment score is indicative of an overall sentiment of the plurality of sentiment expressions.

2. The sentiment score unification system of claim 1, wherein the sentiment unification module is further executable to:
normalize the single sentiment scores; and
generate the single unified sentiment score based on the normalized single sentiment scores.

3. The sentiment score unification system of claim 1, wherein the sentiment unification module is further configured to apply a respective weighting factor to each of the single sentiment scores, wherein a higher relative weighting factor is indicative of a sentiment scoring application being older than a different sentiment scoring application having a lower relative weighting factor.

4. The sentiment score unification system of claim 1, wherein the sentiment unification module is further configured to:
select a subset of the plurality of sentiment scoring applications;
receive a subset of the plurality of single sentiment scores from the subset of sentiment scoring applications, wherein each single sentiment score from the subset of the plurality of single sentiment scores is from a respective sentiment scoring application of the plurality of sentiment scoring applications; and
execute the sentiment unification module, wherein the sentiment unification module is executable to generate a single unified sentiment score based on the subset of single sentiment scores from the subset of sentiment scoring applications.

5. The sentiment score unification system of claim 4, wherein the sentiment unification module is further configured to select the subset of sentiment scoring applications based on a respective relative age of each sentiment scoring application, wherein the sentiment scoring applications of the subset are relatively older than unselected sentiment scoring applications.

6. The sentiment score unification system of claim 4, wherein the sentiment unification module is further configured to select the subset of sentiment scoring applications based on a frequency of prior use of the sentiment scoring applications, wherein the sentiment scoring applications of the subset are used more frequently than unselected sentiment scoring applications.

7. The sentiment score unification system of claim 1, wherein at least one of the received expressions of sentiment is delivered from a social network website.

8. A method comprising:
receiving, with a processor, a plurality of single sentiment scores, wherein each single sentiment score is from a respective scoring sentiment application, wherein each single sentiment score is indicative of a respective overall sentiment of a plurality of sentiment expressions, wherein each sentiment expression from the plurality of sentiment expressions is from a different, independent sentiment source; and
generating, with the processor, a single unified sentiment score based on the plurality of single sentiment scores, wherein the single unified sentiment score is indicative of an overall sentiment of the plurality of sentiment expressions.

9. The method of claim 8, further comprising normalizing, with the processor, the single sentiment scores, wherein, generating, with the processor, the single unified sentiment score comprises generating, with the processor, the single unified sentiment score based on the normalized single sentiment scores.

10. The method of claim 8, further comprising applying, with the processor, a respective weighting factor to each of the single sentiment scores, wherein a higher relative weighting factor is indicative of a sentiment scoring application being older than a different sentiment scoring application having a lower relative weighting factor.

11. The method of claim 8, further comprising:
selecting, with the processor, a subset of the plurality of sentiment scoring applications; and
receiving a subset of the plurality of single sentiment scores from the subset of sentiment scoring applications, and wherein each single sentiment score from the subset of the plurality of single sentiment scores is from a respective sentiment scoring application of the plurality of sentiment scoring applications, wherein generating, with the processor, a single unified sentiment score comprises generating, with the processor, the single unified sentiment score based on the single sentiment scores from the subset of sentiment scoring applications.

12. The method of claim 11, wherein selecting, with the processor, the subset of sentiment scoring applications comprises selecting, with the processor, the subset of sentiment scoring applications based on a respective relative age of each sentiment scoring application, wherein the sentiment scoring applications of the subset are relatively older than unselected sentiment scoring applications.

13. The method of claim 11, wherein selecting, with the processor, the subset of sentiment scoring applications comprises selecting, with the processor, the subset of sentiment scoring applications based on a frequency of prior use of the sentiment scoring applications, wherein the sentiment scoring applications of the subset are used more frequently than unselected sentiment scoring applications.

14. The method of claim 8 wherein at least one of the received expressions of sentiment is delivered from a social network website.

15. A non-transitory computer-readable medium encoded with a set of instructions executable by a processor, the set of instructions comprising:
 instructions to receive a plurality of single sentiment scores, wherein each single sentiment score is from a respective scoring sentiment application, wherein each single sentiment score is indicative of a respective overall sentiment of a plurality of sentiment expressions, wherein each sentiment expression from the plurality of sentiment expressions is from a different, independent sentiment source; and
 instructions to generate a single unified sentiment score based on the plurality of single sentiment scores, wherein the single unified sentiment score is indicative of an overall sentiment of the plurality of sentiment expressions.

16. The non-transitory computer-readable medium of claim 15, wherein the set of instructions further comprises instructions to normalize the single sentiment scores, wherein, the instructions to generate the single unified sentiment score comprise instructions to generate the single unified sentiment score based on the normalized single sentiment scores.

17. The non-transitory computer-readable medium of claim 15, wherein the set of instructions further comprises instructions to apply a respective weighting factor to each of the single sentiment scores, wherein a higher relative weighting factor is indicative of a sentiment scoring application being older than a different sentiment scoring application having a lower relative weighting factor.

18. The non-transitory computer-readable medium of claim 15, wherein the set of instructions further comprises:
 instructions to select a subset of the plurality of sentiment scoring applications; and
 instructions to receive a subset of the plurality of single sentiment scores from the subset of sentiment scoring applications, wherein each single sentiment score from the subset of the plurality of single sentiment scores is from a respective sentiment scoring application of the plurality of sentiment scoring applications, and wherein instructions to generate a single unified sentiment score comprise instructions to generate the single unified sentiment score based on the single sentiment scores from the subset of sentiment scoring applications.

19. The non-transitory computer-readable medium of claim 17, wherein the instructions to select a subset of sentiment scoring application comprise instructions to select the subset of sentiment scoring applications based on a respective relative age of each sentiment scoring application, wherein the sentiment scoring applications of the subset are relatively older than unselected sentiment scoring applications.

20. The non-transitory computer-readable medium of claim 18, wherein the instructions to select a subset of sentiment scoring application comprise instructions to select the subset of sentiment scoring applications based on a frequency of prior use of the sentiment scoring applications, wherein the sentiment scoring applications of the subset are used more frequently than unselected sentiment scoring applications.

* * * * *